US009908363B2

(12) United States Patent
Oh

(10) Patent No.: US 9,908,363 B2
(45) Date of Patent: Mar. 6, 2018

(54) CASTER AND WHITEBOARD COMPRISING CASTER

(71) Applicant: Jun-Seok Oh, Goyang (KR)

(72) Inventor: Jun-Seok Oh, Goyang (KR)

( * ) Notice: Subject to any disclaimer, the term of this patent is extended or adjusted under 35 U.S.C. 154(b) by 0 days.

(21) Appl. No.: 15/518,532

(22) PCT Filed: Oct. 7, 2015

(86) PCT No.: PCT/KR2015/010594
§ 371 (c)(1),
(2) Date: Apr. 12, 2017

(87) PCT Pub. No.: WO2016/060402
PCT Pub. Date: Apr. 21, 2016

(65) Prior Publication Data
US 2017/0232783 A1  Aug. 17, 2017

(30) Foreign Application Priority Data
Oct. 15, 2014  (KR) ........................ 10-2014-0138917

(51) Int. Cl.
*B60B 33/06* (2006.01)
*B43L 1/00* (2006.01)

(52) U.S. Cl.
CPC .............. *B43L 1/00* (2013.01); *B60B 33/063* (2013.01); *B60B 2200/20* (2013.01)

(58) Field of Classification Search
CPC . Y10T 16/193; Y10T 16/1937; Y10T 16/182; Y10T 16/195; B60B 33/04; B60B 33/06; B60B 33/063; B60B 2200/20; B43L 1/00; B43L 1/02; B43L 1/04
See application file for complete search history.

(56) References Cited

U.S. PATENT DOCUMENTS

| | | | | | |
|---|---|---|---|---|---|
| 1,050,352 | A | * | 1/1913 | Deutschman | ........... B60B 33/06 16/32 |
| 1,417,640 | A | * | 5/1922 | Sterner | ................... B60B 33/06 16/19 |
| 1,835,144 | A | * | 12/1931 | Cleaveland | ............. B60B 33/04 16/34 |
| 2,384,020 | A | * | 9/1945 | Farson | ................. A47B 91/028 16/19 |
| 2,566,853 | A | * | 9/1951 | Reinhardt | ............... B60B 33/02 16/18 CG |
| 2,684,734 | A | * | 7/1954 | Wilson | .................. B60B 33/021 16/35 R |
| 2,737,682 | A | * | 3/1956 | Holtz | ...................... B60B 33/06 16/32 |

(Continued)

FOREIGN PATENT DOCUMENTS

DE       2705958 A1 *  8/1978   ............. B60B 33/06
JP       07-043847        9/1995
(Continued)

*Primary Examiner* — Chuck Mah
(74) *Attorney, Agent, or Firm* — Lex IP Meister, PLLC

(57) ABSTRACT

Disclosed are: a caster mounted on a teaching aid including a whiteboard, or furniture, etc. so as to conveniently and stably convert between a movement state and a stopping state; and a whiteboard including the caster. The caster is mounted on a pedestal fixed to the lower end of a column frame on which the whiteboard is mounted.

4 Claims, 9 Drawing Sheets

(56) References Cited

U.S. PATENT DOCUMENTS

| | | | | |
|---|---|---|---|---|
| 4,249,282 | A * | 2/1981 | Little | B60B 33/06 16/32 |
| 4,918,783 | A * | 4/1990 | Chu | B60B 33/04 16/19 |
| 5,001,808 | A * | 3/1991 | Chung | B60B 33/06 16/18 CG |
| 5,899,469 | A * | 5/1999 | Pinto | B62B 3/001 16/35 R |
| 5,956,805 | A * | 9/1999 | Huang | B60B 33/06 16/19 |
| 6,520,460 | B2 * | 2/2003 | Hallberg | F16M 11/42 16/35 R |
| 7,200,894 | B2 * | 4/2007 | Block | B60B 33/0039 16/18 R |
| 7,356,877 | B2 * | 4/2008 | Kim | B60B 33/0007 16/105 |
| 7,506,404 | B2 * | 3/2009 | Block | B60B 33/0021 16/18 R |
| 8,051,533 | B2 * | 11/2011 | Block | B60B 33/0028 16/35 R |
| 8,739,364 | B2 * | 6/2014 | Fromm | B60B 33/0023 16/19 |
| 2003/0041409 | A1 * | 3/2003 | Caporale | B60B 33/0005 16/19 |
| 2011/0162166 | A1 * | 7/2011 | Cooper | B60B 33/0005 16/45 |
| 2014/0109341 | A1 * | 4/2014 | Plate | B60B 33/045 16/19 |
| 2016/0009132 | A1 * | 1/2016 | Spektor | B60B 33/0076 280/79.11 |

FOREIGN PATENT DOCUMENTS

| | | |
|---|---|---|
| JP | 11-227407 | 8/1999 |
| KR | 10-2001-0069115 | 7/2001 |
| KR | 10-2010-0022886 | 3/2010 |
| KR | 10-1274051 | 6/2013 |

* cited by examiner

[Fig.1]
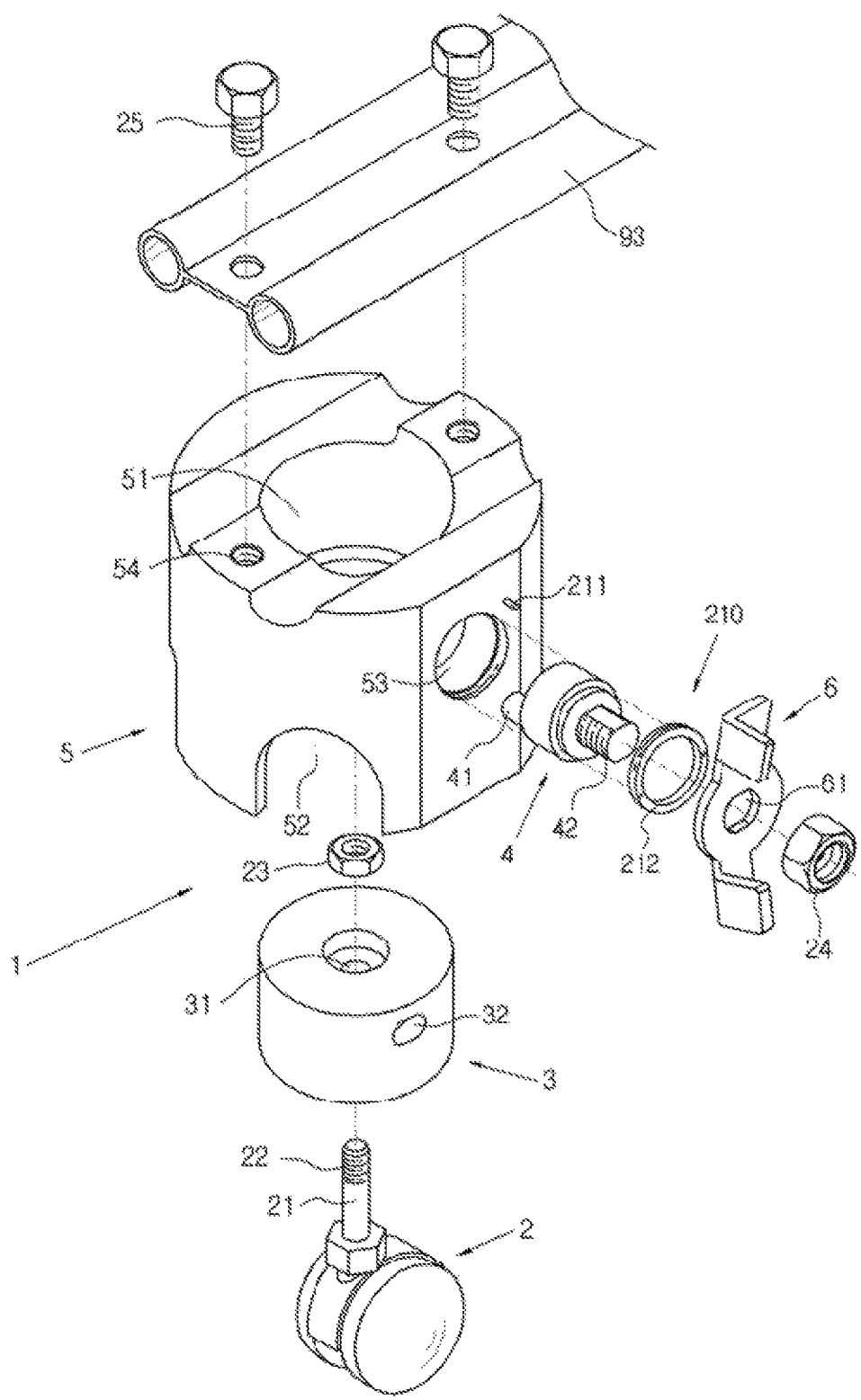

[Fig.2]
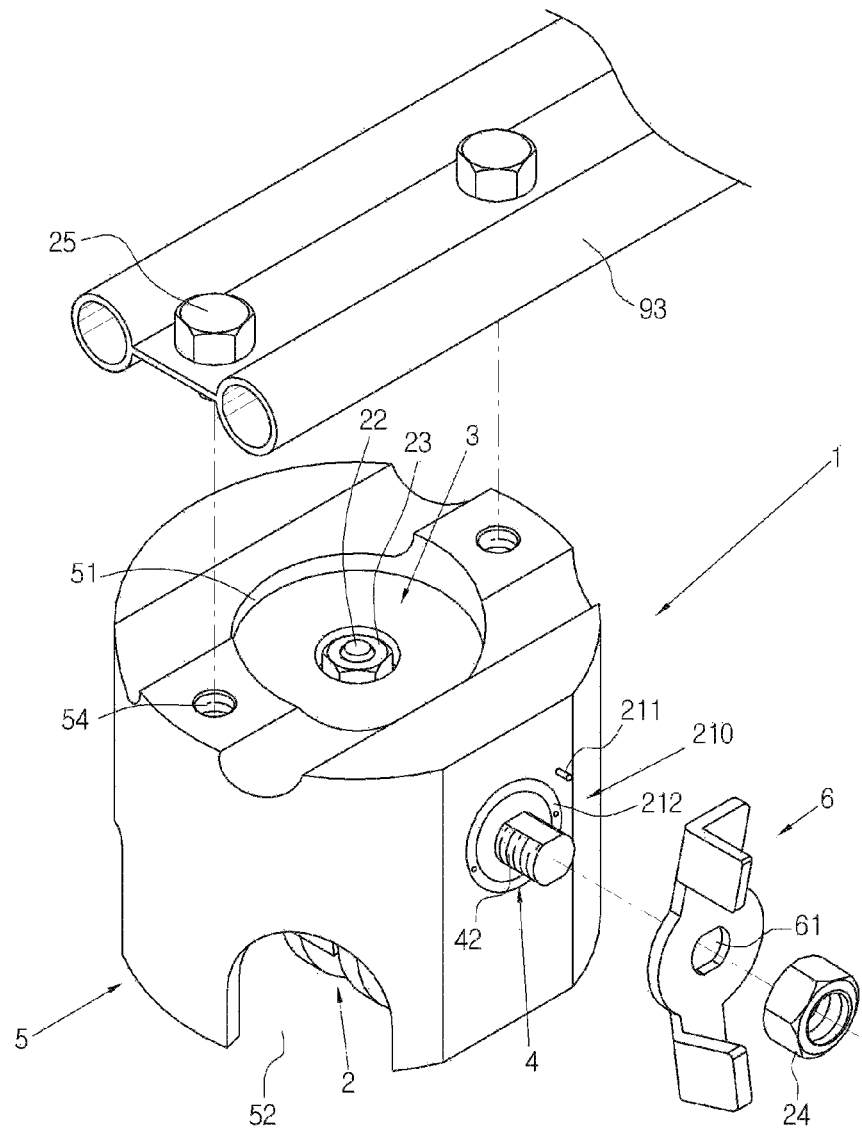

[Fig.3]
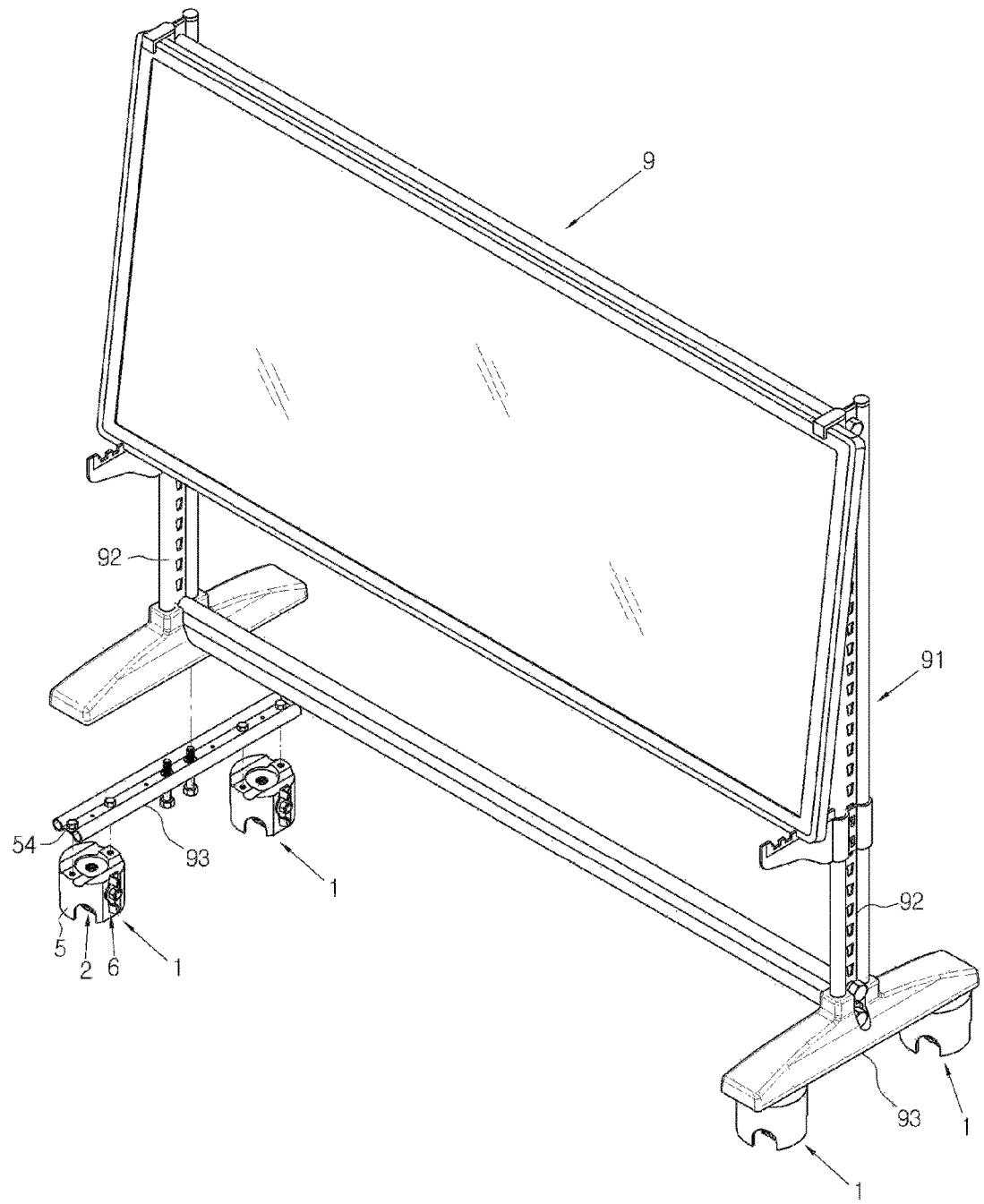

[Fig.4a]
(A)
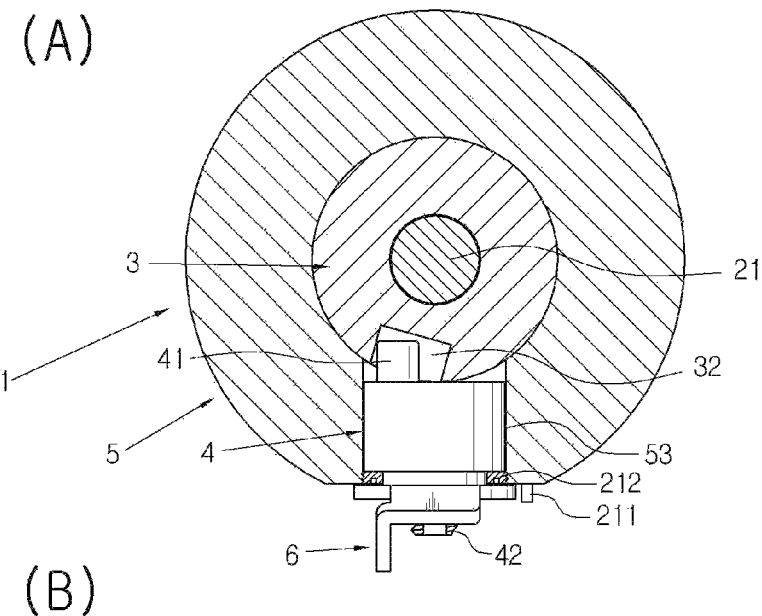
(B)
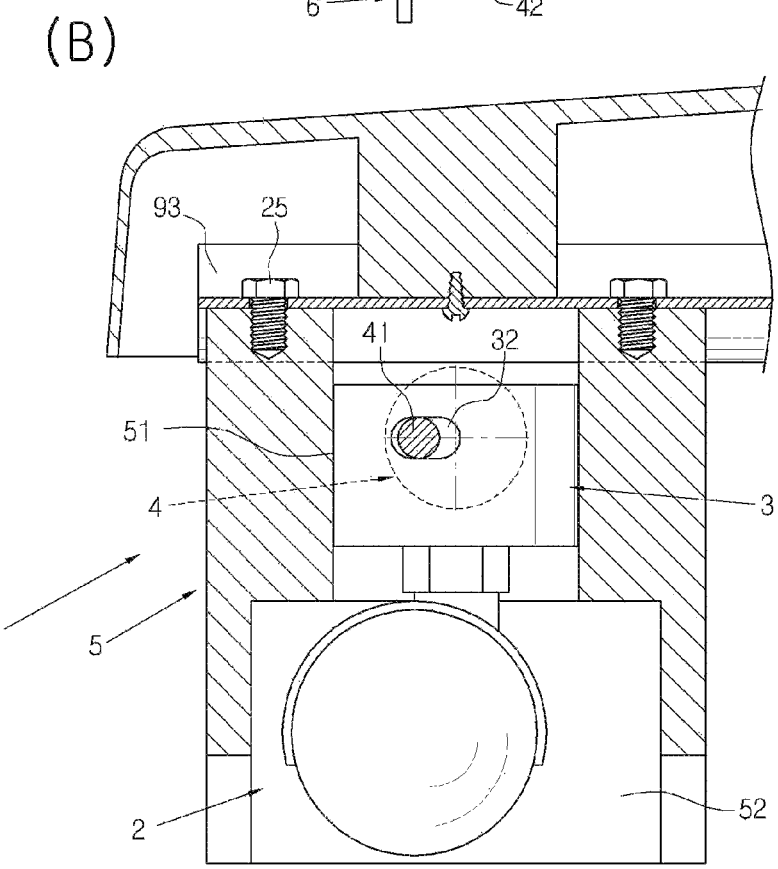

[Fig.4b]
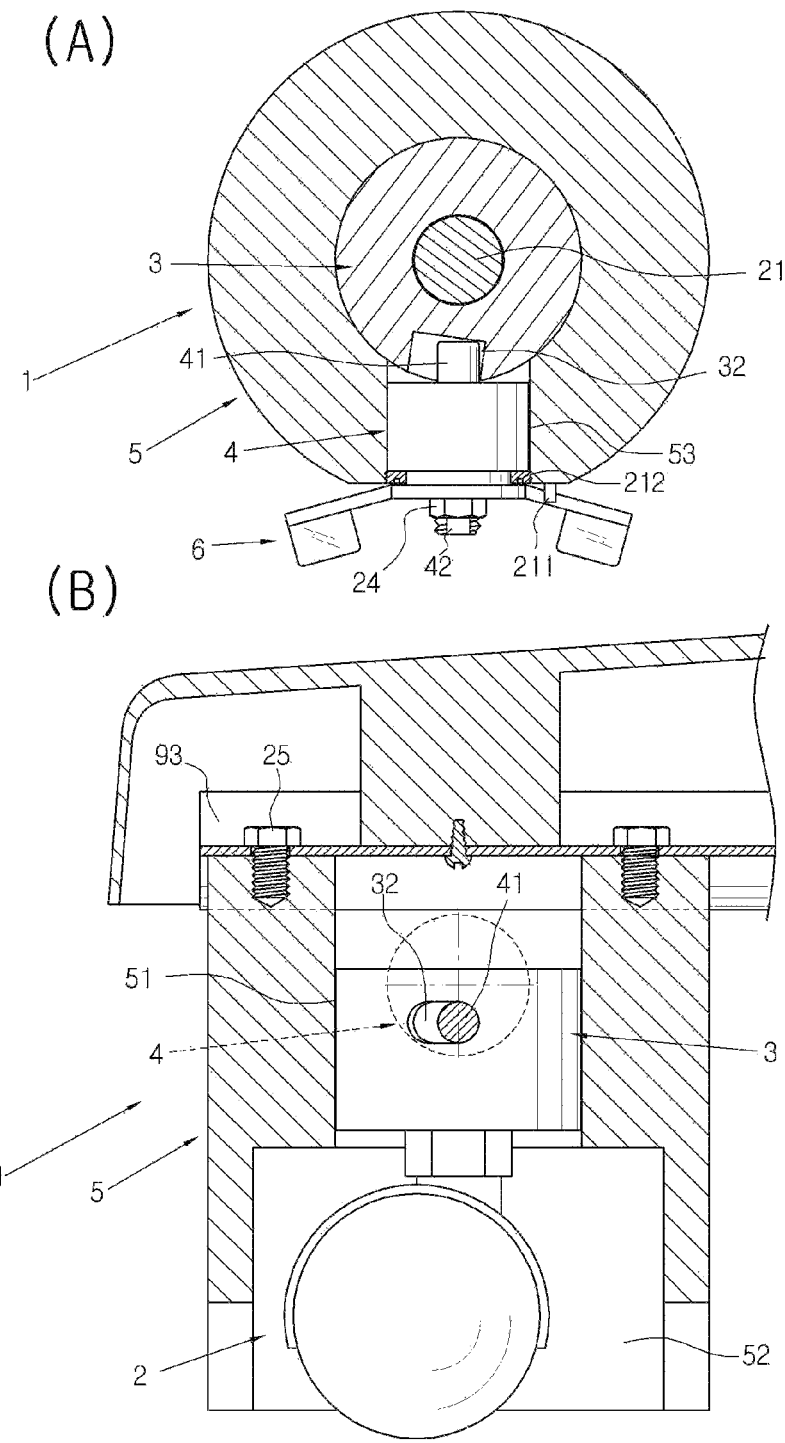

[Fig.4c]
(A)
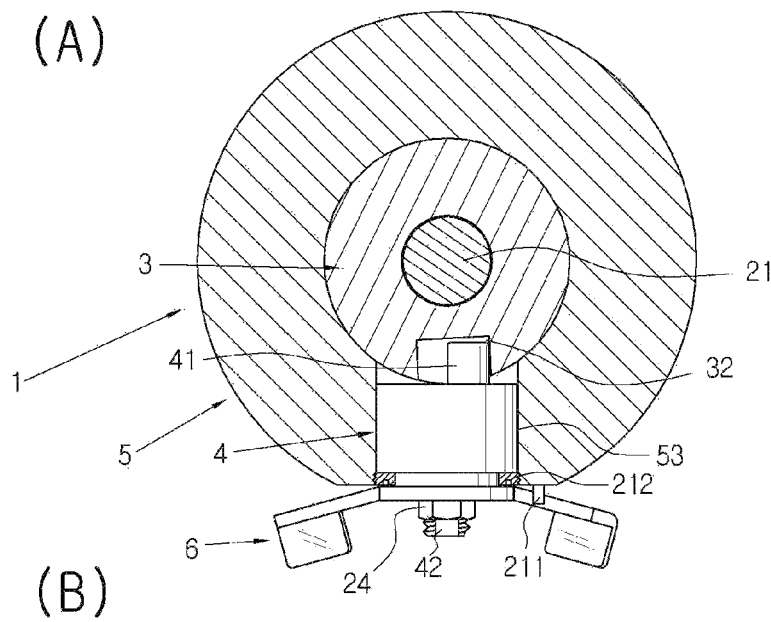
(B)
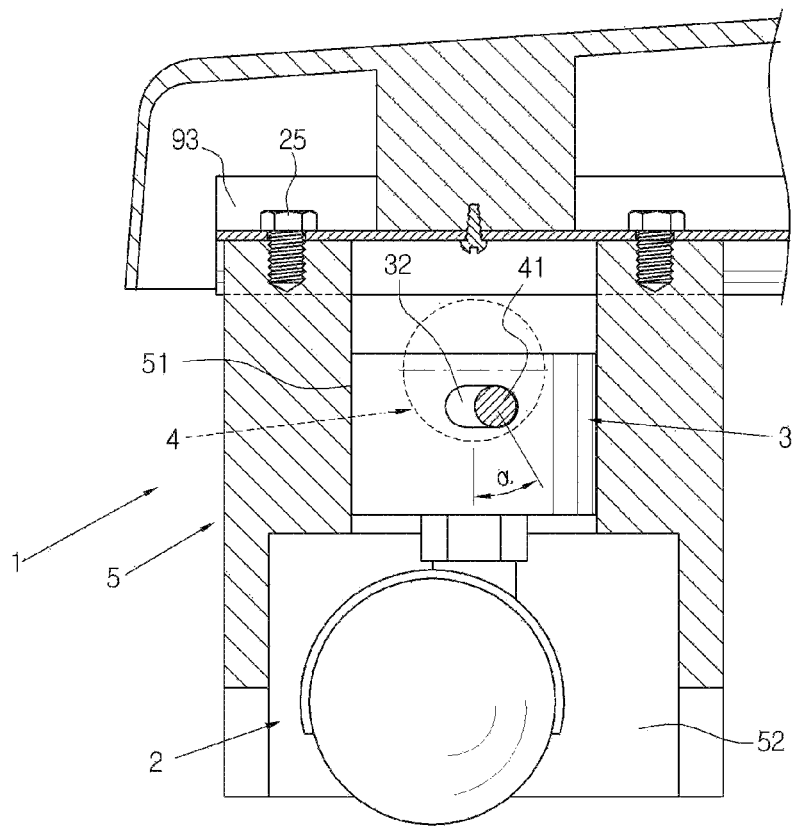

[Fig.5]
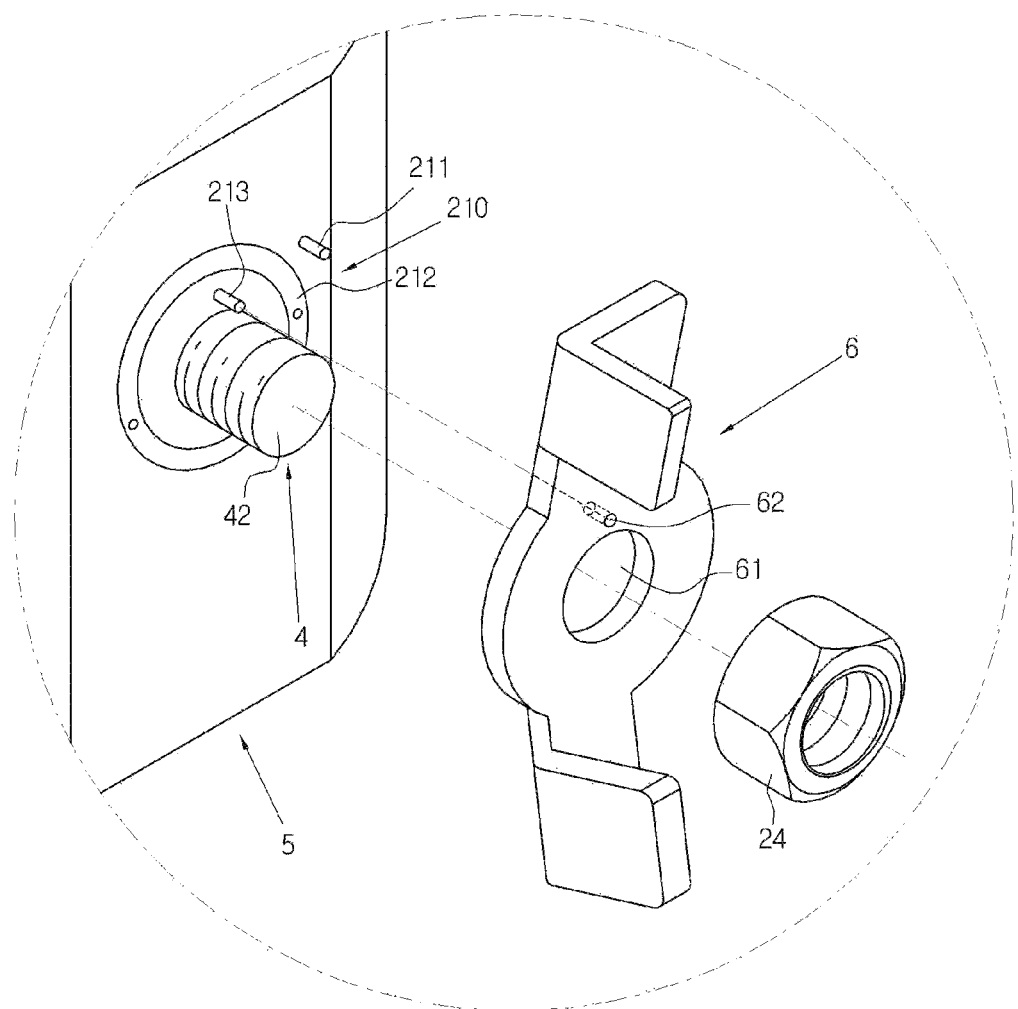

[Fig.6]
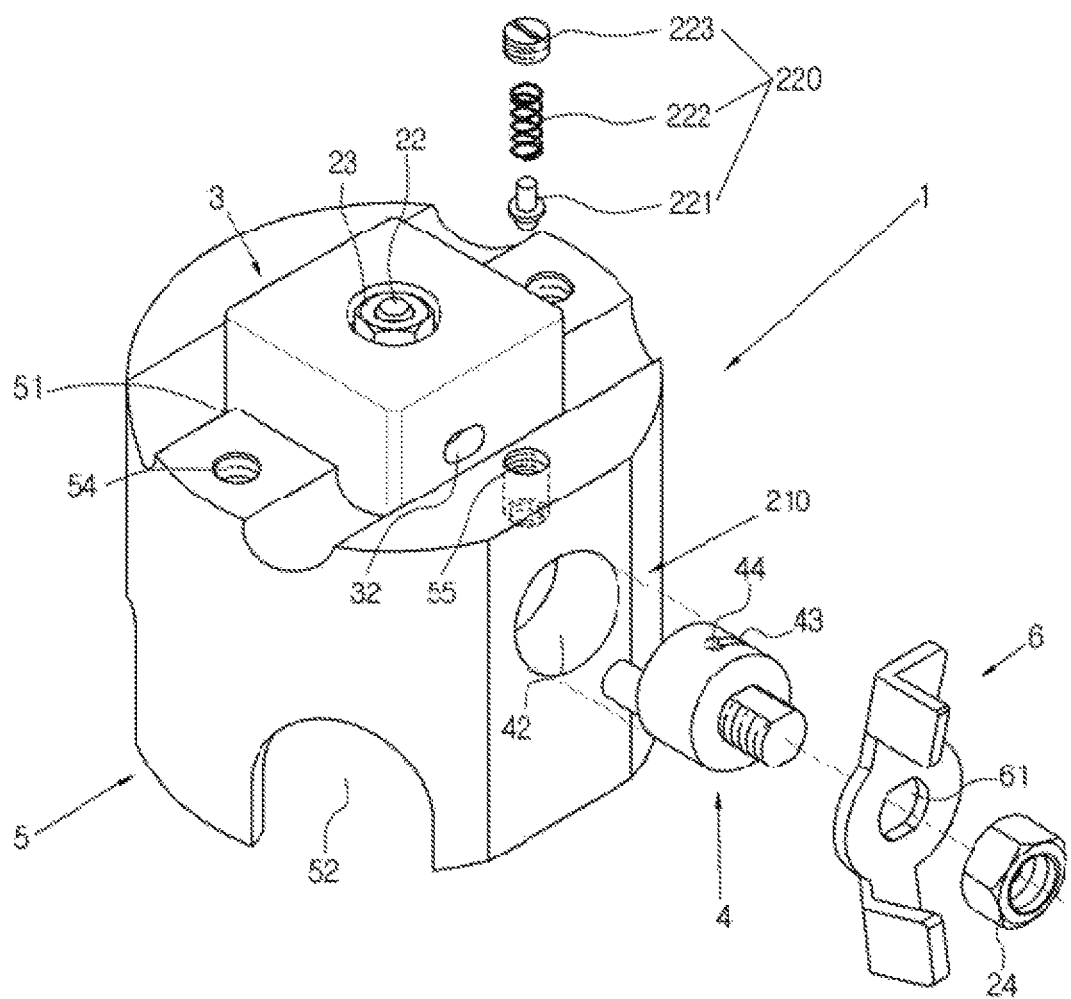

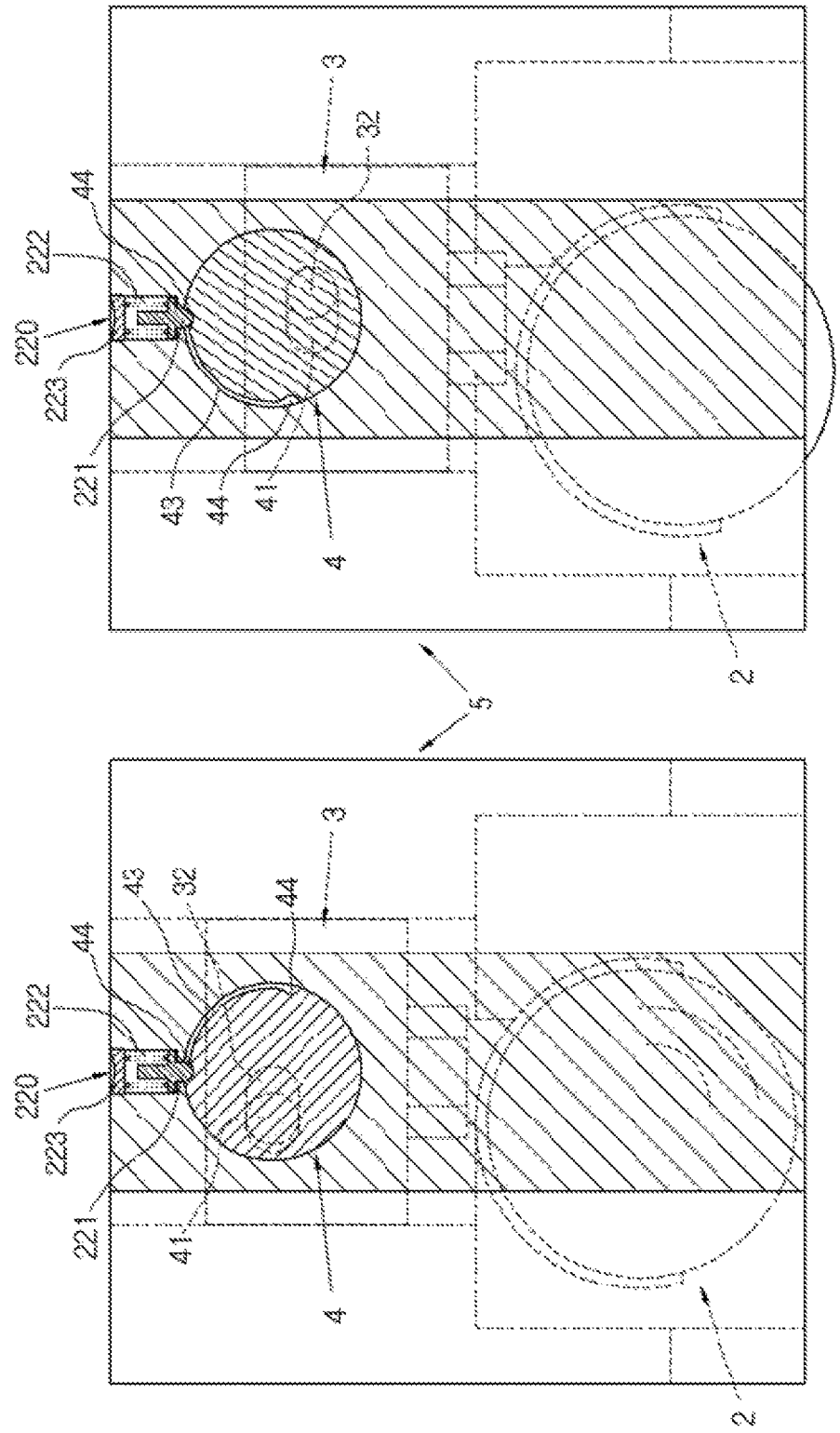
[Fig. 7]

CASTER AND WHITEBOARD COMPRISING CASTER

TECHNICAL FIELD

The present invention relates to a caster and a white board having the caster, and more particularly, to a caster that is mounted on a teaching aid including a white board, or a piece of furniture and so on so as to conveniently convert between a moving state and a stopping state by means of a retractable wheel and to a white board having the caster.

BACKGROUND ART

Generally, a variety of casters are provided to have devices stopping the movements of wheels or retractably moving the wheels so as to conveniently move a teaching aid or a piece of furniture and to keep and utilize the teaching aid or the piece of furniture at the moving state to a given place.

One of conventional casters having a device stopping the movement of a wheel is disclosed in Korean Patent No. 10-0340292 (Dated Jun. 12, 2002) entitled 'chair caster', wherein the chair casters having rotation legs extended from the underside of a seat part in a multiple direction, rotation supports for adjusting heights between the seat part and the rotation legs, and a plurality of wheels disposed on the lower ends of the rotation legs, the chair casters include pinion members disposed inside the wheels, connection rods accommodated into the rotation supports and the rotation legs in such a manner as to move up and down and having the lower ends protruding outwardly from the lower portions of the rotation legs in such a manner as to be coupled or separated correspondingly to or from one sides of the pinion members to control the rotation of the wheels, bases disposed at a given height in the interiors of the rotation supports to guide the connection rods so that the top ends of the connection rods pass therethrough to a given height, springs disposed between the undersides of the bases and one sides of the connection rods to apply elastic forces to the connection rods so that the connection rods move down, and operating levers coupled to the top ends of the connection rods protruding upwardly from the bases by means of hinge pins and having one side ends protruding outwardly through the rotation supports to move the connection rods up.

According to the conventional chair casters, the wheels disposed on the rotation legs stop at the same time or individually in accordance with the operating positions of the operating levers, thereby preventing the casters from moving due to the wheels. However, in the state where a load is applied after a user sits on the seat part, it is hard to manipulate the chair casters, and the chair casters are very complicated in configuration to raise the manufacturing cost and lower the assemblability.

Further, one of conventional casters having a device stopping the rotation of a wheel is disclosed in Korean Patent Application Laid-open No. 10-2010-0022886 (Dated Mar. 3, 2010) entitled 'device for automatically fixing rotation of wheel', and the device includes: a wheel support for radially surrounding a portion of a wheel having a rotary shaft disposed at the center thereof and connected to the rotary shaft of the wheel; a moving part for surrounding the wheel support in such a manner as to be connected to the rotary shaft to move by a given distance up and down with respect to the wheel and the wheel support and having a fixing member disposed on one side thereof above the wheel so as to stop the rotation of the wheel upon the downward movement of the moving part; and an elastic body inserted into a guide column disposed on the top end of the moving part and the top end of the wheel support, wherein a rotatable linear rotary pin is disposed above the top end of the guide column by a given height in such a manner as to pass through a leg, and the rotary pin has a long or oval stopper fixed in the interior of the hollow leg.

According to the conventional device for automatically fixing the rotation of the wheel, if a load is applied to the hollow leg connected to the top end of the moving part, the moving part moves down to allow the fixing member to come into contact with the wheel, thereby automatically fixing the rotation of the wheel, and if the load applied to the leg is removed, the moving part moves up by means of the restoring force of the elastic body to allow the fixing member to be separated from the wheel, thereby rotating the wheel. Accordingly, the stopper fixed to the rotary pin rotates to pressurize the top end of the guide column formed on the top of the wheel support, so that the upward movement of the wheel stops to cause the wheel to be movable. That is, if the load is applied, the rotation of the wheel stops, and if the load is removed, the wheel is movable, thereby improving the conveniences in use. As the wheel does not move in the state where the load is applied, the operation of the guide column stops through the rotation of the stopper, but since there is no device for fixing the rotary pin operating the stopper, the stopper easily rotates even if small vibrations and impacts are generated, so that the wheel moves up and comes into contact with the fixing member, thereby undesirably stopping the rotation of the wheel.

Furthermore, one of conventional casters having a device moving and stopping a wheel through the retraction of the wheel is disclosed in Korean Patent Application Laid-open No. 10-2008-0015242 (Dated Feb. 19, 2008) entitled 'rotation caster installed on moving object', and the rotation caster includes a wheel eccentrically disposed on a wheel installation member, a moving object-attaching member shaft-coupled to the wheel installation member, while a ball bearing being disposed between the wheel installation member and the moving object-attaching member, a cylindrical portion formed in the moving object-attaching member, a post installed on the outer peripheral surface of the cylindrical portion, and an adjusting part having a screw portion formed on the outer peripheral surface of the cylindrical portion and a screw portion formed on the inner peripheral surface of the post so as to adjust an installation height of the post between the cylindrical portion and the post.

According to the conventional rotation caster installed on a moving object, when the cylindrical post or the height adjusting nut rotates to move the installation position of the post up and down, the wheel enters the post or protrudes outwardly from the post, so that it stops or moves. If a load is applied, however, it is very hard to artificially manipulate the cylindrical post or the height adjusting nut.

Also, another conventional caster having a device moving and stopping a wheel through the retraction of the wheel is disclosed in Korean Patent Application Laid-open No. 10-2005-0114596 (Dated Dec. 6, 2005) entitled 'retractable caster', and the retractable caster includes a housing having a moving hole penetrated on the lower portion thereof, the moving hole having a stepped projection formed therealong, a moving piece lockedly mounted selectively on the stepped projection, moved up and down along the moving hole, and elastically installed downwardly in the housing by means of a spring, a caster disposed on the lower portion of the moving piece, and stopping means disposed on the housing and the moving piece to restrict the upward and downward movements of the caster. Further, the stopping means has a stopping groove formed on the outer peripheral surface of the moving piece and a stopper elastically disposed on a coupling hole formed on the housing and adjusted at angle by means of a pin in such a manner as to be selectively stopped to the stopping groove.

According to the conventional retractable caster, the elastic force of the spring is used when the wheel enters a post or is retracted to the outside from the post. If a load is applied, the wheel enters the post, and contrarily, if the load is removed, the wheel protrudes outwardly from the post, thereby improving the conveniences in use. However, if a load itself is heavy or a load is applied additionally, the wheel enters the post, thereby making it impossible to move the wheel. So as to prevent the wheel from stopping, the locking state of the stopper maintaining the outwardly protruding state of the wheel from the post should be released to stop the upward movement of the moving piece or to allow the wheel to enter the post to stop the movement of the wheel. At this time, the free end of the stopper protruding outwardly from the post is compressed through an artificial force applied from a user's finger to cause the stopper to rotate around the pin, and accordingly, the contacted portion of the stopper with the moving piece is rotated and deviated from the moving piece, thereby releasing the locking state of the stopper. However, it is very hard to release the locking state of the stopper just by means of the rotation of the stopper caused only by the compression force of the user's finger in the state where the load is collected to the stopper contacted with the moving piece.

PRIOR ART DOCUMENTS

Patent Documents (Patent document 0001) Korean Patent No. 10-0340292 (Dated Jun. 12, 2002)
(Patent document 0002) Korean Patent Application Laid-open No. 10-2010-0022886 (Dated Mar. 3, 2010)
(Patent document 0003) Korean Patent Application Laid-open No. 10-2008-0015242 (Dated Feb. 19, 2008)
(Patent document 0004) Korean Patent Application Laid-open No. 10-2005-0114596 (Dated Dec. 6, 2005)

DISCLOSURE

Technical Problem

Accordingly, the present invention has been made in view of the above-mentioned problems occurring in the prior art, and it is an object of the present invention to provide a caster having moving means and fixing means adapted to allow a wheel to be retractable in a simpler manner and to stably maintain the position state of each part.

It is another object of the present invention to provide a white board including a caster having moving means and fixing means adapted to allow a wheel to be retractable in a simpler manner and to stably maintain the position state of each part.

Technical Solution

To achieve the above objects, according to the present invention, there is provided a caster including: a wheel coupled to the lower end of a fixing shaft having a male screw formed on the upper periphery thereof in such a manner as to be fastened to a nut; wheel moving means having a slide member having a shaft hole punched on the center thereof in such a manner as to pass the fixing shaft of the wheel therethrough and an operating shaft hole formed on the circumferential surface thereof and an eccentric rotation member having an eccentric shaft formed at one side thereof in such a manner as to be fitted to the operating shaft hole of the slide member and a shaft bolt formed protrudingly from the center of the other side thereof; a main body having a first operating space penetrated at the center thereof in a vertical direction thereof so that the slide member is fitted thereto and moves up and down, a second operating space in which the wheel rotates and moves up and down, a third operating space penetrated in a horizontal direction thereof so that the eccentric rotation member is fitted thereto to allow the eccentric shaft to be introduced into the first operating space and fitted to the operating shaft hole of the slide member, and female screws formed on the upper part thereof for the fastening purpose; an operating lever having a coupling hole punched on the center thereof in such a manner as to be fitted to the shaft bolt of the eccentric rotation member; a fixing nut screw-coupled to the shaft bolt of the eccentric rotation member to fix the operating lever to the eccentric rotation member; and fixing means having a first fixing part or a second fixing part to prevent the eccentric rotation member fitted into the third operating space of the main body from being deviated from the third operating space and to stop the rotation of the eccentric rotation member.

Advantageous Effects

According to the present invention, the caster and the white board having the caster are configured wherein even if a load is added, the slide member fixing the wheel easily moves up and down through the rotation of the eccentric shaft of the eccentric rotation member, so that the wheel is retractable from the main body and thus moves or stops, and since the deviation of the eccentric rotation member and the stop of the rotation of the eccentric rotation member are prevented through the first fixing part or the second fixing part simple in configuration, the stopping state or movable state of the wheel can be stably maintained, so that the caster is very convenient to use, simple in configuration, and provides the reduction of the manufacturing cost thereof.

DESCRIPTION OF DRAWINGS

FIG. 1 is an exploded perspective view showing a caster according to the present invention.

FIG. 2 is a perspective view showing the partially assembled caster according to the present invention.

FIG. 3 is a partially exploded perspective view showing a white board having a caster according to the present invention.

FIGS. 4a to 4c are partially enlarged cross and longitudinal sectional view showing the operating processes of the caster according to the present invention.

FIG. 5 is an enlarged perspective view showing another example of a first fixing part in the caster according to the present invention, wherein main parts are illustrated in the state wherein an operating lever is coupled to an eccentric rotation member.

FIG. 6 is an exploded perspective view showing a second fixing part of the caster according to the present invention.

FIGS. 7a and 7b are longitudinal sectional views showing the operating processes of the second fixing part of the caster according to the present invention.

MODE FOR INVENTION

Hereinafter, an explanation on a caster and a white board having the caster according to the present invention will be in detail given with reference to the attached drawing.

FIGS. 1 to 3 are an exploded perspective view showing a caster according to the present invention and a partially exploded perspective view showing a white board having a caster according to the present invention, wherein a reference numeral 1 denotes a caster, 2 denotes a wheel, 3 denotes a slide member, 4 denotes an eccentric rotation member, 5 denotes a main body, 6 denotes an operating lever, 9 denotes a white board, 91 denotes a stand, 92 denotes a column frame, and 93 denotes a base.

As shown, a caster according to the present invention, which is movably mounted on the underside of a teaching aid such as a chalk board, a white board and the like or on the underside of a piece of furniture, includes a main body 5 and moving means and fixing means mounted on the main body 5 to retractably move a wheel 2 and stop the wheel 2.

First, the wheel 2 is coupled to the lower end of a fixing shaft 21 having a male screw 22 formed on the upper periphery thereof in such a manner as to be fastened to a nut 23.

Further, the moving means, which moves the wheel 2 down in such a manner as to allow the wheel 2 to be retractable, includes a slide member 3 and an eccentric rotation member 4 for operating the slide member 3.

The slide member 3 has a shaft hole 31 punched on the center thereof in such a manner as to pass the fixing shaft 21 of the wheel 2 therethrough and an operating shaft hole 32 formed on the circumferential surface thereof in such a manner as to have a shape of a long hole extended in a horizontal direction thereof. That is, the slide member 3 is accommodated in the main body 5 and moves up and down to allow the wheel 2 to be retractable.

The eccentric rotation member 4 has an eccentric shaft formed at one side thereof in such a manner as to be fitted to the operating shaft hole 32 of the slide member 3 and a shaft bolt 42 formed protrudingly from the center of the other side thereof. On the other hand, the eccentric rotation member 4 rotates to an angle of about 95 to 100° to allow the eccentric shaft 41 to move the slide member 3 up and down.

The main body 5 has a first operating space 51 penetrated at the center thereof in a vertical direction thereof so that the slide member 3 is fitted thereto and moves up and down, a second operating space 52 in which the wheel 2 rotates and moves up and down, a third operating space 53 penetrated in a horizontal direction thereof so that the eccentric rotation member 4 is fitted thereto to allow the eccentric shaft 41 to be introduced into the first operating space 51 and fitted to the operating shaft hole 32 of the slide member 3, and female screws 54 formed on the upper part thereof for the fastening purpose.

Further, an operating lever 6 is provided to rotate the eccentric rotation member 4 and thus has a coupling hole 61 punched on the center thereof in such a manner as to be fitted to the shaft bolt 42 of the eccentric rotation member 4.

So as to directly transmit the rotary force of the operating lever 6 to the eccentric rotation member 4, on the other hand, the shaft bolt 42 of the eccentric rotation member 4 are cut and flattened on the top and underside portions thereof, as shown in FIG. 2, and also, the coupling hole 61 of the operating lever 6 fitted to the shaft bolt 42 has the linear surfaces corresponding to the flattened surfaces of the shaft bolt 42. Otherwise, as shown in FIG. 5, a fixing pin 213 is disposed on the eccentric rotation member 4, and a fixing hole 62 is formed on the operating lever 6 in such a manner as to fit the fixing pin 213 thereto. The coupling means for easily transmitting the rotary force of the operating lever 6 to the eccentric rotation member 4 is not limited thereto, and instead of the shaft bolt 42 of the eccentric rotation member 4, that is, the operating lever 6 can be directly fixed to the eccentric rotation member 6 by means of a screw not shown in the figure.

So as to fix the operating lever 6 to the eccentric rotation member 4, furthermore, a fixing nut 24 is screw-coupled to the shaft bolt 42 of the eccentric rotation member 4.

Further, fixing means is provided to prevent the eccentric rotation member 4 fitted into the third operating space 53 of the main body 5 from being deviated from the third operating space 53 and to stop the rotation of the eccentric rotation member 4 and thus has a first fixing part 210 or a second fixing part 220.

As shown in FIGS. 1 and 2, the first fixing part 210 as the fixing means includes a finishing ring 212 screw-coupled to the front end periphery of the third operating space 53 to prevent the eccentric rotation member 4 fitted into the third operating space 53 of the main body 5 from being deviated from the third operating space 53 and a stopping pin 211 fixed to the outside of the entrance of the third operating space 53 of the main body 5. The stopping pin 211 is located to stop the rotation of the operating lever 6 so that the eccentric shaft 41 of the eccentric rotation member 5 stops when it reaches a rotation angle α deviated from the vertical center line as shown in A and B of FIG. 4c, and functions as a stopper.

Further, the second fixing part 220 as the fixing means is configured to replace the finishing ring 212 and the stopping pin 211 of the first fixing part 210, and as shown in FIGS. 6 to 7b, the eccentric rotation member 4 has a guide slot 43 formed on the circumferential surface thereof and stopping grooves 44 formed on both ends of the guide slot 43, a support rod 221 having a semispherical lower end portion and a protruding flange formed on the center portion thereof in such a manner as to be fittedly contacted with the guide slot 34 and the stopping grooves 44, a spring 222 adapted to provide an elastic force to the support rod 221, and a stopper 223 screw-coupled to the front end periphery of an accommodation space 55 punched on the main body 5 to communicate with the third operating space 53 of the main body 5 so that the support rod 221 and the spring 222 are accommodated in the accommodation space 55. The semispherical lower end portion of the support rod 221 is fittedly contacted with the guide slot 43 formed on the circumferential surface of the eccentric rotation member 4 and the stopping grooves 44 and thus functions as a locking protrusion, thereby preventing the eccentric rotation member 4 from being deviated from the third operating space 53 of the main body 5.

Further, the first operating space 51 of the main body 5 and the slide member 3 moving up and down in the first operating space 51 have circular sectional shapes as shown in FIG. 1 and square sectional shapes as shown in FIG. 6.

Accordingly, four casters 1 according to the present invention are mounted on a white board 9 as one of a teaching aid or a piece of furniture as shown in FIG. 3. That is, the tops of the main bodies 5 of the casters 1 come into contact with the bases 93 fixed to the lower ends of column frames 92 of stands 91 of the white board 9, and next, after screw portions of fastening bolts 25 pass through the punched holes of the bases 93, they are screw-coupled to the female screws 54 formed on top of the main bodies 5 of the casters 1, thereby finishing mounting the casters 1 on the white board 9.

When the wheels 2 are located in the second operating spaces 52 of the main bodies 5 after the casters 1 are mounted on the bases 93, the underside surfaces of the main bodies 5 come into contact with the floor, so that the movements of the casters 1 stop. That is, as shown in A and B of FIG. 4a, the operating levers 6 are in vertical states, and the eccentric shafts 41 of the eccentric rotation members 4 reach the uppermost positions thereof, so that the slide members 3 fixing the wheels 2 move up.

So as to move the casters 1, next, the wheels 2 move down under the second operating spaces 52 of the main bodies 5 and come into contact with the floor.

Accordingly, if the operating levers 6 rotate to an angle of 90° in a counterclockwise direction, the eccentric shafts 41 rotate by means of the rotation of the operating levers 6 and at the same time by means of the rotation of the eccentric rotation members 4, and the rotation of the eccentric shafts 41 permits the position of the operating shaft holes 32 of the slide members 3 to move down, so that as shown in A and B of FIG. 4b, the operating levers 6 are in horizontal states, and the eccentric shafts 41 of the eccentric rotation members 4 reach the bottom dead point as the lowermost positions thereof, so that the slide members 3 fixing the wheels 2 move down.

As shown in A and B of FIG. 4b, the slide members 3 are located at the lowermost positions, and the eccentric shafts 41 of the eccentric rotation members 4 are located on the vertical center lines. At this time, the eccentric rotation members 4 may freely rotate due to external vibration or impacts, and so as to prevent the free rotation of the eccentric rotation members 4 and to maintain downward movements of the wheels 2, accordingly, stopping positions should be set.

That is, one method for maintaining downward movements of the wheels 2 is carried out wherein as shown in A and B of FIG. 4c, the stopping pins 211 stop the rotation of the operating levers 6 so that the operating levers 6 rotating the eccentric rotation members 4 do not rotate anymore when the eccentric shafts 41 of the eccentric rotation members 4 reach the rotation angles α deviated by an angle of 5 to 10° from the vertical center line as shown in A and B of FIG. 4c.

Further, another method for maintaining downward movements of the wheels 2 is carried out wherein as shown in FIG. 7a, the semispherical lower ends of the support rods 221 are fitted to the stopping grooves 44 formed on the circumferential surfaces of the eccentric rotation members 4 by means of the elastic forces of the springs 222 to stop the rotation of the eccentric rotation members 4, and if the eccentric rotation members 4 rotate to move down the slide members 3 fixing the wheels 2, the guide slots 43 come into contact with the semispherical lower ends of the support rods 221, so that the wheels 2 protrude downwardly from the main bodies 5 and come into contact with the floor, and further, the semispherical lower ends of the support rods 221 are lockedly fitted to the stopping grooves 44 formed on the circumferential surfaces of the eccentric rotation members 4, thereby allowing the wheels 2 to be stably movable.

According to the present invention, as mentioned above, the downward movement of the wheel 2 is stably maintained by means of the artificial operation of the operating lever 6, by means of the simple and easy manipulation of the moving means for allowing the eccentric shaft 41 of the eccentric rotation member 4 rotated by the rotary force of the operating lever 6 to move the slide member 3 through the operating shaft hole 32, and by means of the first fixing part 210 or the second fixing part 220 for preventing the deviation of the eccentric rotation member 4 as one of the moving means and for setting the fixing position of the eccentric rotation member 4, so that the caster 1 is very convenient to use, simple in configuration, easy to manufacture, and provides the reduction of the manufacturing cost thereof.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

EXPLANATION OF REFERENCE NUMERALS IN THE DRAWINGS

1: caster
2: wheel
21: fixing shaft
22: male screw
23: nut
24: fixing nut
3: slide member
31: shaft hole
32: operating shaft hole
4: eccentric rotation member
41: eccentric shaft
42: shaft bolt
43: guide slot
44: stopping groove
5: main body
51: first operating space
52: second operating space
53: third operating space
54: female screw
55: accommodation space
6: operating lever
61: coupling hole
62: fixing hole
9: white board
91: stand
92: column frame
93: base
210: first fixing part
211: stopping pin
212: finishing ring
213: fixing pin
220: second fixing part
221: support rod
222: spring
223: stopper

The invention claimed is:
1. A caster mounted on the underside of a teaching aid or a piece of furniture, the caster comprising:
a wheel coupled to the lower end of a fixing shaft having a male screw formed on the upper periphery thereof in such a manner as to be fastened to a nut;
moving means having a slide member having a shaft hole punched on the center thereof in such a manner as to pass the fixing shaft of the wheel therethrough and an operating shaft hole formed on the circumferential surface thereof and an eccentric rotation member having an eccentric shaft formed at one side thereof in such a manner as to be fitted to the operating shaft hole of the slide member and a shaft bolt formed protrudingly from the center of the other side thereof;

a main body having a first operating space penetrated at the center thereof in a vertical direction thereof so that the slide member is fitted thereto and moves up and down, a second operating space in which the wheel rotates and moves up and down, a third operating space penetrated in a horizontal direction thereof so that the eccentric rotation member is fitted thereto to allow the eccentric shaft to be introduced into the first operating space and fitted to the operating shaft hole of the slide member, and female screws formed on the upper part thereof for the fastening purpose;

an operating lever having a coupling hole punched on the center thereof in such a manner as to be fitted to the shaft bolt of the eccentric rotation member;

a fixing nut screw-coupled to the shaft bolt of the eccentric rotation member to fix the operating lever to the eccentric rotation member; and fixing means having a first fixing part or a second fixing part to prevent the eccentric rotation member fitted into the third operating space of the main body from being deviated from the third operating space and to stop the rotation of the eccentric rotation member.

2. The caster according to claim 1, wherein the first fixing part comprises a finishing ring screw-coupled to the front end periphery of the third operating space and a stopping pin fixed to the outside of the entrance of the third operating space of the main body, and the second fixing part comprises a support rod having a semispherical lower end portion and a protruding flange formed on the center portion thereof in such a manner as to be fittedly contacted with a guide slot formed on the circumferential surface of the eccentric rotation member and stopping grooves formed on both ends of the guide slot, a spring adapted to provide an elastic force to the support rod, and a stopper screw-coupled to the front end periphery of an accommodation space punched on the main body to communicate with the third operating space of the main body so that the support rod and the spring are accommodated in the accommodation space.

3. A white board comprising the caster according to claim 1, wherein the caster comes into contact with a base fixed to the lower end of a column frame of a stand of the white board, and fastening bolts pass through the base in such a manner as to be screw-coupled to the female screws formed on top of the main body of the caster.

4. A white board comprising the caster according to claim 2, wherein the caster comes into contact with a base fixed to the lower end of a column frame of a stand of the white board, and fastening bolts pass through the base in such a manner as to be screw-coupled to the female screws formed on top of the main body of the caster.

* * * * *